United States Patent

Smirmaul

[15] 3,641,810
[45] Feb. 15, 1972

[54] NONCONTACTING SENSOR APPARATUS

[72] Inventor: Heinz J. Smirmaul, Painted Post, N.Y.
[73] Assignee: Corning Glass Works, Corning, N.Y.
[22] Filed: June 1, 1970
[21] Appl. No.: 42,325

[52] U.S. Cl. .................................................................73/37.5
[51] Int. Cl. .................................................................G01b 13/12
[58] Field of Search .............................73/37.5–37.7, 505, 73/194 C; 137/81.5

[56] References Cited

UNITED STATES PATENTS 3,481,180  12/1969  Jones ..................................... 73/37.5
3,324,891  6/1967   Rhoades ........................ 137/81.5 X

*Primary Examiner*—Louis R. Prince
*Assistant Examiner*—William A. Henry, II
*Attorney*—Clarence R. Patty, Jr. and Walter S. Zebrowski

[57] ABSTRACT

A noncontacting vortex-generating sensor apparatus for detecting and indicating the presence of an object in the path of a stream of fluid and for providing an indication of the distance of said object from the nozzle emitting said stream of fluid. The apparatus comprises a cylindrical vortex-generating chamber, a supply port for introducing fluid into the vortex chamber, a vortex outlet port communicating with a central portion of the vortex chamber for permitting the fluid to be exhausted therefrom, nozzle means for issuing or emitting the exhausted fluid as a stream, and a sensing port by means of which the pressure within the central portion of the vortex chamber is sensed.

12 Claims, 6 Drawing Figures

INVENTOR.
Heinz J. Smirmaul
BY
Walter S. Zebrowski
ATTORNEY

INVENTOR.
Heinz J. Smirmaul
BY Walter S. Zebrowski
ATTORNEY

NONCONTACTING SENSOR APPARATUS

FIELD OF THE INVENTION

The present invention relates specifically to a vortex-generating sensor apparatus which is responsive to the presence of an object in the path of a stream of fluid when the object is sufficiently close to the outlet of the nozzle issuing the stream of fluid.

An object of the invention is to provide a means for detecting or indicating the presence of an object or article.

Another object is to provide a means for determining the position of an object or article.

Still another object is to provide an efficient and economical noncontacting sensor apparatus.

SUMMARY OF THE INVENTION

Briefly, in accordance with the present invention a vortex-generating sensor apparatus is provided for detecting and/or indicating the presence of an object in the path of a stream of fluid and for determining the distance of such an object from a nozzle of the apparatus. Said sensor apparatus comprises a substantially cylindrical vortex-generating chamber defined by a substantially cylindrical wall and two substantially flat ends, with means being provided for introducing a fluid into the vortex chamber. A vortex outlet port in one of the flat ends communicates with a central portion of the vortex chamber for permitting the fluid to be exhausted or emitted from the vortex chamber. Nozzle means is directly or otherwise connected to said vortex outlet port to convey the fluid emitted from said vortex chamber and issue such fluid as a stream. Means are also included for sensing the pressure within the central portion of the vortex chamber. An increase of the pressure in the central portion of the vortex chamber indicates the presence of an object in the path of the issuing stream, said pressure being a function of the distance of the object from the nozzle means.

Additional objects, features, and advantages of the present invention will become apparent to those skilled in the art from the following detailed description and attached drawings on which, by way of example, only the preferred embodiments of this invention are illustrated.

DESCRIPTION OF THE PREFERRED EMBODIMENTS

The fluid suitable for the purposes of the present invention may be compressible such as air, nitrogen, or other gases, or incompressible such as water or other liquids. Both compressible and incompressible fluids may contain solid material. This invention is not limited to any particular fluid.

Figure 1:
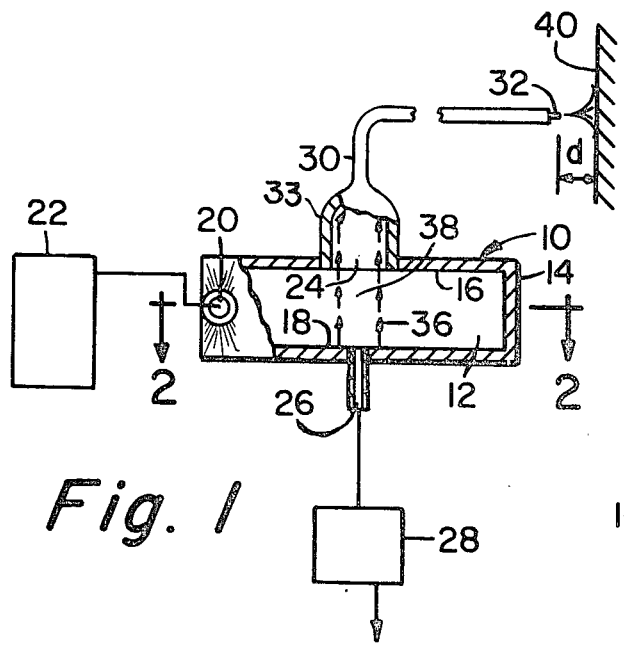
FIG. 1 shows an elevational view, partly in section and partly in schematic form, of a sensor apparatus illustrating one embodiment of the present invention.

Referring to FIG. 1, a fluid operated vortex-generating sensor or device 10 is illustrated comprising a vortex-generating chamber 12 of substantially cylindrical shape defined by a substantially cylindrical peripheral defining wall 14 and flat end members 16 and 18. In addition, sensor 10 also includes a fluid supply port 20 through which fluid from fluid source 22 flows into vortex chamber 12. A sensor outlet port 24 is formed in end member 16, through which port the vortex fluid is exhausted or emitted. Port 24 is formed or disposed substantially along the longitudinal axis of sensor 10. A pressure-sensing port 26 communicates through member 18 with the central portion of chamber 12 to provide means through which pressure therein can be sensed or detected. The central portion of chamber 12 is defined by the periphery of outlet port 24.

Pressure sensing port 26 is connected to a suitable pressure-sensing or utilization device 28 which may be any logic component such as an OR/NOR gate, a Schmitt trigger, a fluid switch, or other suitable pressure-sensitive device. Outlet port 24 is connected by suitable means such as tubing or piping 30 to nozzle 32. As is illustrated in FIG. 1, transition member 33 is provided intermediate nozzle 32 and outlet port 24 and, of course, nozzle 32 may be connected directly to outlet port 24 through member 33 without tubing or piping 30, if such is desired. Since outlet port 24 must be at least equal in size to sensing port 26 and should be at least slightly larger than port 26 for greatest efficiency as hereinafter described, member 33 is necessary to provide an egress means for the vortex fluid and should have a size, at least at the point of attachment to outlet port 24, which is about equal to that of outlet port 24 to preserve the integrity of the vortex. That is, the size of member 33 should be such that the vortex is not dissipated as would occur if its size was too large with respect to the size of outlet port 24. On the other hand, if the size was too small, the flow through member 33 would completely fill the passage and the pressure within the central portion of the vortex would not remain substantially lower than ambient or the pressure elsewhere in the vortex-generating chamber as herein explained. Furthermore, as will be understood, if the size of member 33, at least where it forms outlet port 24 or at the point of attachment to outlet port 24, was smaller than sensing port 26, it would produce the same or similar results respectively to those occurring when outlet port 24 is smaller than sensing port 26 as herein explained.

Figure 2:
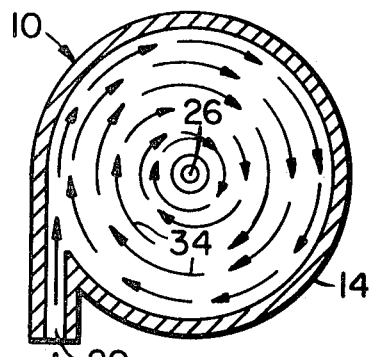
FIG. 2 shows a cross-sectional plan view of the vortex generator of FIG. 1 taken along lines 2—2 thereof.

Referring additionally to FIG. 2, it is seen that fluid supply port 20 is connected to chamber 12 in a tangential manner so that fluid enters through fluid supply port 20 about the periphery of chamber 12. The inner surface of peripheral defining wall 14 causes a smooth circular flow pattern of the fluid as indicated generally by the outer arrows in FIG. 2. After substantially one revolution around wall 14, the fluid follows a spiral flow pattern 34 with continuously increasing velocity, characteristic of a vortex pattern, until it reaches the central portion of chamber 12. The fluid acquires a component of force normal to the path of flow pattern 34 and, when it reaches the periphery of outlet port 24, the fluid is emitted or escapes from sensor 10 through outlet port 24 substantially about the periphery thereof to form an output fluid envelope 36 as generally represented in FIG. 1 by a series of arrows, which fluid envelope defines vortex funnel 38.

The operation of the vortex-generating sensor apparatus of the present invention is illustrated by the following typical example. Referring to FIGS. 1 and 2, air from a suitable source 22 is transmitted through fluid supply port 20 and tangentially enters vortex-generating chamber 12 at the periphery thereof along the inner surface of defining wall 14. The ambient fluid medium is also air. The fluid entering vortex chamber 12 is caused to flow in a spiral pattern with continuously increasing velocity until it reaches the periphery of outlet port 24. The fluid having acquired a component of force normal to the path of the fluid flow is emitted through sensor outlet port 24 whereupon the fluid is transmitted through suitable means such as tubing 30 to a nozzle 32 from which it is emitted as a stream of fluid. Due to the vortex action within vortex chamber 12, the pressure in vortex funnel 38 has been observed to be relatively low in comparison to ambient pressure and the pressure elsewhere in the vortex-generating chamber. The pressure in the vortex funnel is detected at sensing port 26 by sensing or utilization device 28.

Figure 3:
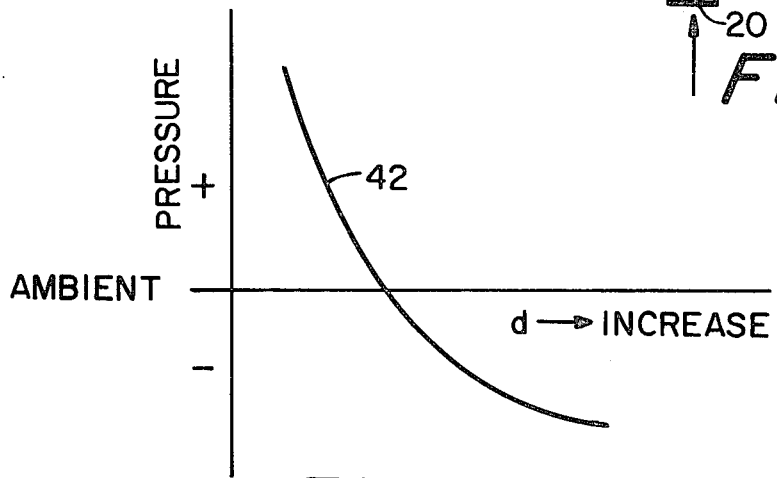
FIG. 3 is a graph illustrating the relationship between pressure and the distance of an article from the nozzle of the apparatus of the embodiment shown in FIG. 1.

When the stream of fluid emitting from nozzle 32 is directed against an object, such as wall 40, the pressure sensed at sensing port 26 increases as the distance $d$ between nozzle 32 and wall 40 decreases. Referring to FIG. 3, the relationship of the pressure at sensing port 26 with respect to distance $d$ is shown in graph form. It is seen that as nozzle 32 is brought close to wall 40 the pressure at sensing port 26 is of a high positive value. As nozzle 32 is drawn away from wall 40, thereby increasing distance $d$, the pressure sensed at sensing port 26 decreases along a curve approximately that shown by reference numeral 42 until it falls substantially below ambient pressure. It is therefore seen that by obstructing the flow from nozzle 32 the pressure within the vortex funnel sensed at sensing port 26 increases and, if the obstruction is lessened, then the pressure in vortex funnel 38 decreases. Such reduction in pressure occurs, because, when the obstruction is lessened, it does not cause as high a back pressure to be created within the nozzle and connecting means, and consequently in vortex funnel 38. Accordingly, a negative pressure or vacuum is created by the vortex action within the vortex funnel when no obstruction is present to cause a back pressure in the system.

Figure 4:
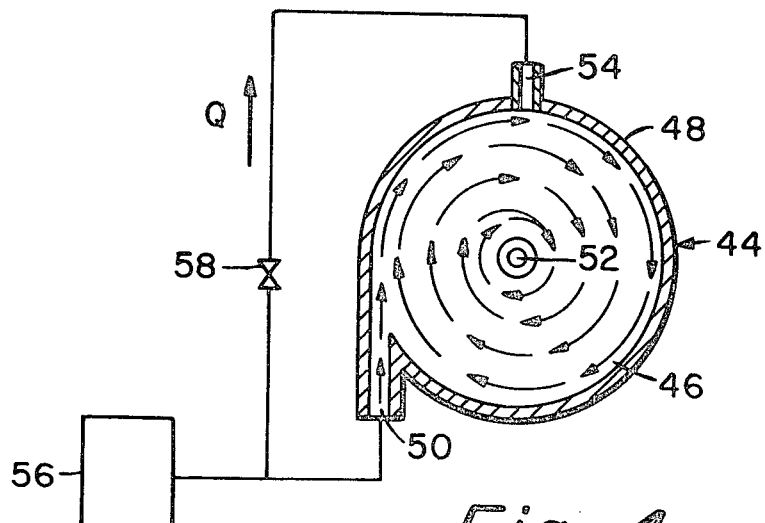
FIG. 4 is a cross-sectional plan view, partially in schematic form, of another embodiment of a vortex-generating sensor apparatus of the present invention.

FIG. 4 illustrates another embodiment of the present invention wherein a vortex-generating device or sensor 44 comprises a vortex-generating chamber 46 defined by peripheral defining wall 48. Sensor 44 has a fluid supply port 50, a pressure-sensing port 52, and a sensor outlet port, not shown. Sensor 44 is quite similar to sensor 10 of FIGS. 1 and 2 except that it is provided with a secondary fluid supply port 54. The sensor outlet port, stream-emitting nozzle, and connecting means therebetween are as shown and described in connection with FIG. 1, as is the operation of the nozzle. Fluid from a suitable fluid source 56 is flowed through fluid supply port 50, which fluid causes sensor 44 to operate in substantially the same manner as sensor 10 described in connection with FIGS. 1 through 3. Such operation is illustrated by the pressure sensed at pressure-sensing port 52 being a function of the distance $d$ between its nozzle and an object toward which the stream of fluid from the nozzle is emitted.

Figure 5:
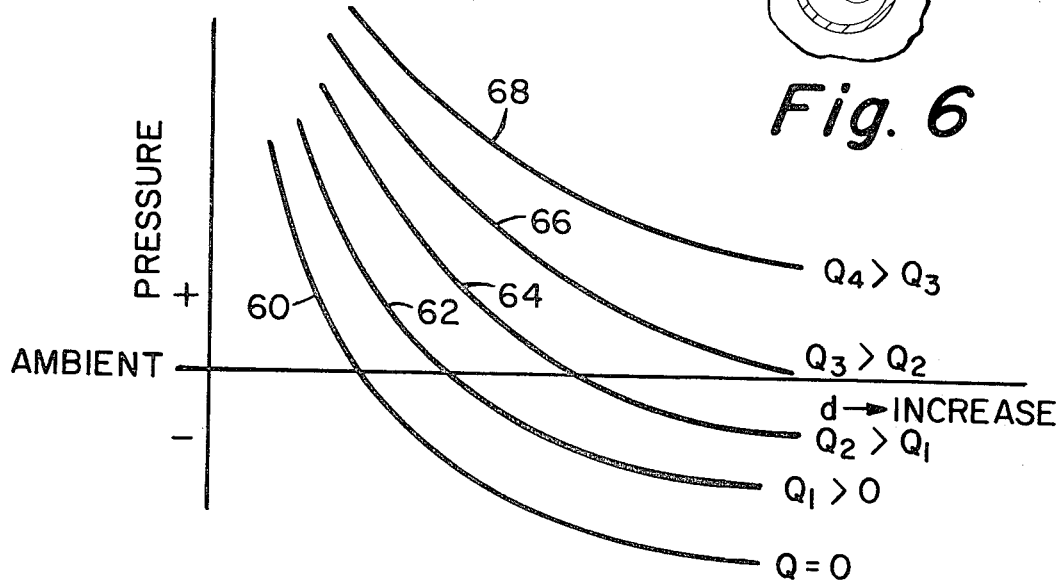
FIG. 5 is a graph of a family of curves illustrating the relationship between pressure and the distance of an article from the nozzle of the apparatus of the embodiment shown in FIG. 4.

In the embodiment of FIG. 4 there is shown a secondary fluid-transmission means connected between source 56 and port 54, which means embody valve 58. If valve 58 is caused to be opened, additional fluid from source 56 will then flow through secondary fluid supply port 54 and merge with the fluid entering vortex-generating chamber 46 through fluid supply port 50. This additional fluid entering through port 54 is designated by Q in FIG. 4 and affects the operation of the sensor by changing the pressure versus distance $d$ relationship as illustrated by the family of curves shown in FIG. 5. Curve 60 is a curve where flow Q is zero, that is where valve 58 is shut off and no secondary fluid is flowing through port 54, and curve 62 illustrates the pressure and distance relationship when some quantity of fluid does flow through secondary fluid supply port 54. Curve 62 is shown to result from a secondary fluid flow $Q_1$ which is of some finite value. Increasing the flow of secondary fluid through supply port 54 to some value $Q_2$, which is greater than $Q_1$, results in a relationship as illustrated by curve 64. Similarly by increasing the flow of secondary fluid to some value $Q_3$ which is greater than $Q_2$, or $Q_4$ which is greater than $Q_3$ results in curves 66 and 68 respectively, as shown in FIG. 5. It is seen from observing the family of curves in FIG. 5 that, by increasing the flow of secondary fluid, the pressure sensed within the vortex funnel at pressure-sensing port 52 increases for given distances of the nozzle away from the object being sensed.

Although the embodiment of FIG. 4 has been shown with valve 58 as a means of controlling secondary fluid flow through supply port 54, any variable restrictor may be used in the line. By changing the pressure versus distance $d$ relationship thereby shifting the curve upward, it is possible to match the requirements of the sensing or utilization device.

Figure 6:
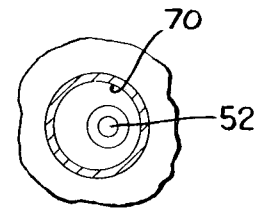
FIG. 6 shows a fragmentary plan view of a sensor illustrating another embodiment of the present invention.

The pressure sensed at port 52 may be increased in a manner similar to that described hereinabove in connection with the embodiment illustrated in FIG. 4 by changing the location of pressure-sensing port 52. By moving port 52 closer to the peripheral edge of the sensor outlet port and vortex funnel, the pressure sensed will increase for a given distance the nozzle is disposed from the object to which its stream is directed. This comes about since the lowest pressure within the vortex funnel is at the center and the pressure increases along a radial therefrom to the outlet periphery. The eccentric location of such sensing port 52 with respect to outlet port 70 is illustrated in FIG. 6. Of course, the same is true of the embodiment illustrated in FIG. 1.

It should be noted that the openings defined by outlet port 24 in FIG. 1 and the outlet port, not shown, in the embodiment illustrated in FIG. 4 should be at least slightly larger in area and diameter than are the openings defined by their corresponding sensing ports 26 and 52 respectively. This relationship is necessary to insure that the vortex fluid is exhausted or emitted entirely through the outlet port and avoids losses that could otherwise occur if a portion of the fluid were to issue through the sensing port. In addition, the fluid pressure in the sensing port would be affected if such relationship did not exist. It has been found, however, that the noncontacting sensor apparatus of the present invention is operative, although at low efficiency, when the outlet port and the sensing port have the same areas and diameters.

The various embodiments of the present invention described hereinabove provide an efficient and economical noncontacting vortex-generating sensor apparatus by means of which an object may be detected or its presence indicated, and the distance to such an object may be determined. Furthermore, the vortex action of the present apparatus gives a pressure gain which was not heretofore obtainable.

Although the present invention has been described with respect to specific details of certain embodiments thereof, it is not intended that such details be limitations on the present invention except insofar as set forth in the following claims.

I claim:

1. A vortex-generating sensor apparatus comprising
    a substantially cylindrical vortex-generating chamber defined by a wall having a substantially cylindrical inner surface and two substantially flat ends,
    a source of driving fluid,
    means connected to said source for substantially tangentially introducing said fluid into said generating chamber at the periphery thereof,
    means communicating with a central portion of said generating chamber through one of said flat ends for exhausting said fluid from said generating chamber,
    nozzle means connected to said exhausting means for issuing a stream of said fluid, said nozzle having an orifice area less than the area of said exhausting means and having an orifice size in relation to the quantity of driving fluid issued therefrom such that the flow through said nozzle substantially completely fills the orifice opening, and
    means for sensing the pressure within said central portion of said generating chamber, an increase of said pressure indicating the presence of an object in the path of said stream, said pressure being a function of the distance of said object from said nozzle means.

2. The sensor apparatus of claim 1 wherein the means for exhausting comprises a vortex outlet port formed in one of said flat ends substantially along the longitudinal axis of said sensor.

3. The sensor apparatus of claim 2 wherein said sensing means comprises a pressure-sensing port formed in said other of said flat ends, said port communicating with said central portion of said generating chamber eccentrically in relation to said outlet port.

4. The sensor apparatus of claim 2 wherein said sensing means comprises a pressure-sensing port formed in the other of said flat ends, which port communicates with said central portion of said generating chamber substantially along the longitudinal axis of said outlet port.

5. The sensor apparatus of claim 4 wherein the diameter of said outlet port is larger than the diameter of said sensing port.

6. The sensor apparatus of claim 1 wherein said introducing means comprises a fluid supply port disposed to direct said fluid into said vortex-generating chamber along the peripheral defining wall thereof.

7. The sensor apparatus of claim 1 further comprising a secondary fluid supply port disposed in said wall upstream of said introducing means for providing a secondary fluid flow into said generating chamber.

8. The sensor apparatus of claim 7 further comprising a means for controlling the amount of said secondary fluid flow.

9. The sensor apparatus of claim 8 wherein said means for controlling said secondary fluid flow is a variable flow restrictor.

10. The sensor apparatus of claim 1 further comprising a utilization device connected to said sensing means.

11. The sensor apparatus of claim 1 wherein the means for exhausting comprises a vortex outlet port formed in one of said flat ends substantially along the longitudinal axis of said sensor, wherein said sensing means comprises a pressure-sensing port formed in the other of said flat ends communicating with said central portion of said generating chamber substantially along the longitudinal axis of said outlet port, the diameter of said outlet port being larger than the diameter of said sensing port, and wherein said means for introducing comprises a fluid supply port disposed to direct said fluid into said vortex-generating chamber along the peripheral wall thereof, further comprising a utilization device connected to said pressure-sensing port.

12. The sensor apparatus of claim 11 further comprising
    a secondary fluid supply port disposed in said wall upstream of said fluid supply port for providing a secondary fluid flow into said generating chamber, and
    a means for controlling the amount of said secondary fluid flow.

* * * * *